United States Patent [19]

Takahashi

[11] Patent Number: 4,461,287

[45] Date of Patent: Jul. 24, 1984

[54] PORTABLE EXERCISE AND TRACTION APPARATUS

[76] Inventor: Hiroshi Takahashi, 153 E. Whittier Blvd., Ste. A, LaHabra, Calif. 90631

[21] Appl. No.: 361,743

[22] Filed: Mar. 25, 1982

[51] Int. Cl.³ .......................... A01B 1/02; A61H 1/02

[52] U.S. Cl. ...................................... 128/75; 272/145; 272/900

[58] Field of Search .......................... 128/75, 71, 25 R; 272/62, 63, 144, 145, 93, 134, 61, 900

[56] References Cited

U.S. PATENT DOCUMENTS

| | | | |
|---|---|---|---|
| D. 191,690 | 10/1961 | Ryan | 272/144 |
| 860,517 | 7/1907 | Berglund | 272/63 |
| 1,366,155 | 1/1921 | Bardwell et al. | |
| 1,804,441 | 5/1931 | Silva | 128/75 |
| 2,932,510 | 4/1960 | Kravitz | 272/62 |
| 3,006,643 | 10/1961 | Ryan | 272/144 |
| 3,218,068 | 11/1965 | Warman | 272/62 |
| 3,342,484 | 9/1967 | Christensen | 272/85 |
| 3,593,708 | 7/1971 | Steele | 128/75 |
| 3,874,375 | 4/1975 | Penner | 128/75 |
| 4,077,403 | 3/1978 | Steele | 128/75 |
| 4,337,942 | 7/1982 | Sidlinger | 272/144 |
| 4,341,378 | 7/1982 | Agyagos | 272/144 |

FOREIGN PATENT DOCUMENTS

| | | | |
|---|---|---|---|
| 136542 | 9/1974 | United Kingdom | 128/75 |

*Primary Examiner*—Richard J. Johnson
*Attorney, Agent, or Firm*—Robert Louis Finkel

[57] ABSTRACT

A horizontal padded body-supporting bar is rigidly mounted to a pair of spaced, parallel, upright floor-standing stanchions and supports the weight of the user's body with the head, torso and upper limbs hanging inverted on one side of the bar and the legs on the other. Mounting brackets permit a pair of arms, carrying a leg restraining cross member, to be mounted to the stanchions extending either horizontally rearwardly or vertically upwardly of the body-supporting bar. For rigidity the stanchions may be provided with a pair of rails at their lower ends, or with mounting brackets adapted releasably to engage mating brackets attached to the jambs at the opposite sides of a doorway.

16 Claims, 5 Drawing Figures

FIG. 1
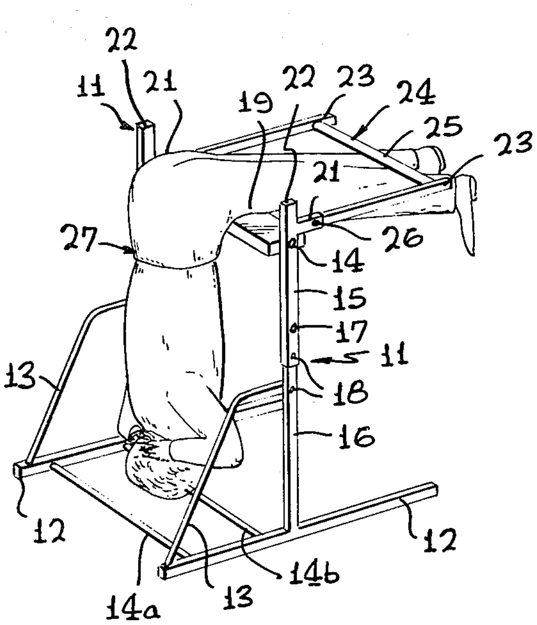
FIG. 2
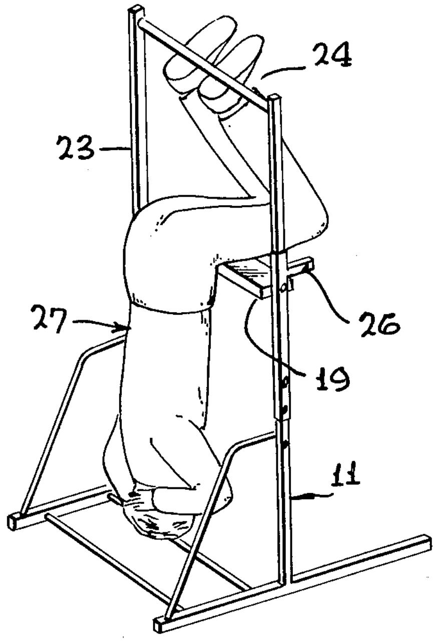
FIG. 4
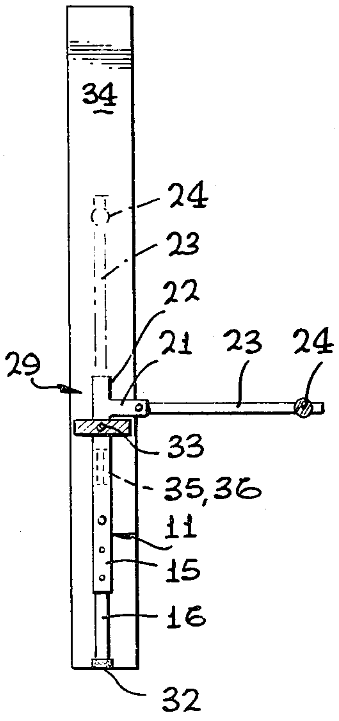
FIG. 5
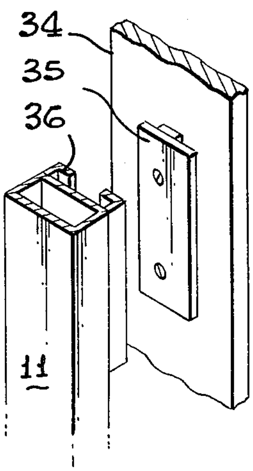
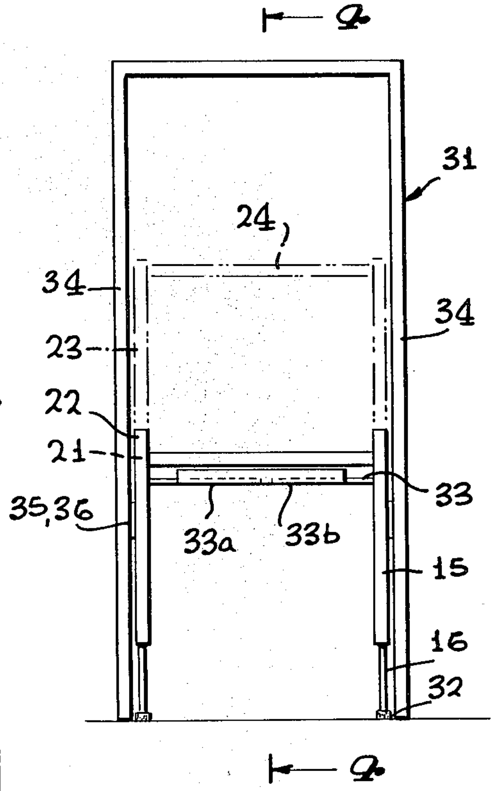
FIG. 3

PORTABLE EXERCISE AND TRACTION APPARATUS

BACKGROUND OF THE INVENTION

1. Field of the Invention

This invention relates to devices for applying traction to the back, and more particularly to such devices in which the body is supported to utilize the weight of the head, torso and upper limbs, suspended to hang inverted, to supply the tractional force.

2. Prior Art

The theraputic value of spinal traction is well known. Various means have been devised to provide such traction.

Some of these, intended primarily for use under professional supervision or in commercial gymnasia, require the body to be supported and restrained on a bed or platform and apply tractional force by means of weights acting through systems of cables and pulleys, cams, levers, and the like.

Others are designed to employ the weight of the body itself as the source of tractional force. Some of these provide means for supporting the upper body upright and allowing the weight of the lower body and legs to pull downwardly. Some are adapted to support the body in an inverted position, head downward, and utilize the weight of the head, torso and upper limbs to provide the desired force. U.S. Pat. Nos. 1,366,155 to Bardwell, et al., 3,874,375 to Penner, and 4,077,403 to Steele are illustrative of this last category.

Typically, these latter devices are difficult or awkward to mount and dismount, especially for the infirm and those who are athletically less adept. Many of them are relatively complex, bulky structures or utilize mounting hardware which is permanently affixed to a door jamb or some other fixture and are thus not easily transported or stored.

SUMMARY OF THE INVENTION

The subject invention employs a pair of upstanding stanchions to support a padded, rigid, horizontal body-supporting cross member at the height of the user's pelvic region. The stanchions may be mounted to stabilizing bases for free-standing use, or may be provided with means for releasably securing them for stability to the jambs of a doorway.

A pair of parallel arms attached to the stanchions extend rigidly rearwardly, perpendicular to the body-supporting cross member. At their ends they carry a second cross member which serves to restrain the user's legs.

The user stands between the rearwardly projecting arms, facing the body-supporting cross member and bends forwardly over the cross member until the entire weight of his or her body is supported by it, head, torso, and upper limbs hanging downwardly, and legs extended and directed rearwardly. Although not necessary, the second cross member supported by the parallel arms is in a position to engage the backs of the legs to prevent them from rotating upwardly beyond the horizontal and allowing the user inadvertently to slip off the body-supporting member. The stanchions are within easy reach and may facilitate mounting and dismounting.

In an alternative embodiment of the invention, means are provided for mounting the arms supporting the leg restraining member to the stanchions vertically upright, so that the leg restraining cross member is positioned above the body-supporting member. In this configuration, the device permits the user to bend the legs at the knees and engage the leg restraining member with the feet, shins or ankles, thereby providing a desired degree of security against unintentionally slipping from the body-supporting member.

An object of the subject invention is to provide an apparatus for utilizing body weight in spinal extension exercise and to apply spinal traction.

Another object is to provide such an apparatus which is readily portable and easily stored.

Yet another object is to provide an exercise and traction apparatus of simple construction which can easily be mounted and dismounted, even by the infirm or athletically inept.

Yet another object is to provide an apparatus of the type described which may be adapted to be free-standing or to be mounted in a doorway.

A further object is to provide an apparatus of this type which does not require the installation of special hardware for its use.

Additional objects and advantages of the invention will become apparent from the following specification and the appended drawings.

BRIEF DESCRIPTION OF THE DRAWINGS

FIG. 1 is a perspective view of a preferred embodiment of the subject invention illustrating one mode of its operation;

FIG. 2 is a perspective view of the embodiment of FIG. 1 illustrating another mode of operation;

FIG. 3 is a front elevational view illustrating another preferred embodiment of the subject invention installed in a doorway;

FIG. 4 is a side elevational view of the embodiment of FIG. 3, taken in the direction 4—4; and FIG. 5 is an enlarged fragmentary perspective view of the stabilizing brackets and bracket engaging means of the embodiment of FIGS. 3 and 4.

DESCRIPTION OF THE PREFERRED EMBODIMENTS

Referring to FIGS. 1 and 2, a preferred embodiment of the subject invention includes a pair of sturdy stanchions 11 held rigidly upright by rails 12. Braces 13 stabilize the upper end of stanchions 11, and rigid spacer 14 maintains them in spaced parallel alignment. If desired, additional spacers **14*a*, 14*b*** may be employed to further strengthen the structure.

Preferably, stanchions 11 are constructed from telescoping sections 15, 16 and are provided with fastening means, such as removable pins 17 and mating holes 18, for conveniently adjusting their length.

A horizontal body-supporting member 19 is secured to the upper ends of stanchions 11. In the embodiment illustrated in FIG. 1, member 19 is mounted to spacer 14; however, other conventional means may be used for attaching member 19 to stanchions 11.

The upper ends of stanchions 11 are provided with a pair of attachment means, shown here in the form of sleeves 21, 22, one directed rearwardly and the other upwardly, adapted to receive the ends of a pair of rigid, parallel arms 23. The opposite ends of arms 23 support a cross piece 24 which may be a padded, rigid or resilient bar 25, as illustrated, or a flexible strap (not shown). A removable pin 26 insertable through matching holes in sleeves 21, 22 and the ends of arms of 23 permit arms 23 easily to be positioned to extend horizontally reawardly, as shown in FIG. 1, or vertically upwardly, as in FIG. 2.

To use the apparatus, the user adjusts stanchions 11 to position body-support member 19 at a convenient height, preferably at the level of the pelvic region, and facing the device from the rear, bends forwardly over member 19 until his or her body 27 is comfortably supported by it, head and torso downward. Stanchions 11 and braces 13 may be used, if desired, to facilitate mounting member 19.

This inverted position is found to be surprisingly stable, since the unsupported weight of the legs balances the weight of the downwardly depending head, upper body and arms. For psycological reasons, in practice it is advantageous to give the user an added sense of stability, and for this reason the arms 23 and cross piece 24 are provided to serve as leg restraining means in the manner illustrated in FIGS. 1 and 2. In the former, the legs extend rearwardly nearly horizontally and are prevented from rotating upwardly by cross piece 24. In the latter, the legs are bent at the knees and are forced downwardly by the cross piece 24. In either configuration, the apparatus allows the downward pull of the head, torso and upper limbs to exert the maximum tractive force available on the spine and its associated muscles and tissues.

To dismount, the mounting procedure is reversed, the stanchions 11 and braces 13 again being used for assistance as necessary.

In the embodiment of FIGS. 3 and 4, the apparatus 29 is adapted to be supported by a structure, such as the frame 31 of the doorway. As shown, the stanchions 11 formed by telescoping sections 15, 16 are provided with friction pads 32 at their lower ends. Spacer 14 is formed in telescoping sections **33*a*, 33*b* having conventional locking means (not shown) allowing them to be adjusted to position stanchions 11 in close proximity to the jambs 34 on either side of door frame 31 when the apparatus 29 is set up in a doorway. To stabilize the apparatus 29, conventional interlocking means, such as the brackets 35 attached to jambs 34 and bracket-receiving flanges 36 mounted to stanchions 11 shown in FIG. 5**, are provided.

In all other particulars the structure and operation of the apparatus 29 of this embodiment are substantially identical with those of the embodiment illustrated in FIGS. 1 and 2.

It will be understood that the structures shown and described, while preferred embodiments of the subject invention, are intended to serve as representative examples of the various alternative forms and constructions covered by the claims.

What is claimed is:

1. A portable exercise and traction apparatus, comprising:
- a pair of spaced upstanding stanchions;
- spacing means bridgingly connected to said stanchions and rigidly maintaining them in parallel relationship;
- a horizontal body supporting member immovably mounted to said stanchions and adapted to support the full weight of the body upon the user's upper thighs;
- leg restraining means rigidly mounted to said stanchions, said restraining means including a cross member positioned generally parallel to, and spaced from said body supporting member for restraining engagement by the user's lower extremities when the user's upper body depends vertically from said body supporting member;
- stabilizing means associated with said stanchions for rigidly maintaining said stanchions in a vertical position; and
- mounting means on said stanchions for selectively positioning said leg restraining means alternatively in vertical or horizontal alignment with said body supporting member.

2. The apparatus of claim 1, wherein said body supporting member is rigidly mounted to said spacing means.

3. The apparatus of claim 2, wherein the lower ends of said stanchions are adapted to support said apparatus on a floor.

4. The apparatus of claim 3, wherein the lower ends of said stanchions are provided with floor mounts.

5. The apparatus of claim 4, wherein said floor mounts are friction pads.

6. The apparatus of claim 4, wherein said floor mounts are elongated rails.

7. The apparatus of claim 4, wherein said stabilizing means include a pair of elongated braces rigidly attached at their upper ends to said stanchions, extending perpendicular to said body supporting member downwardly away from said stanchions, and supported at their other ends by the floor, the upper portions of said braces defining a pair of horizontally disposed hand holds.

8. The apparatus of claim 7, wherein said floor mounts are elongated rails, and the said other end of each of said braces is attached to one of said rails at a distance from the point of attachment of the associated stanchion to said rail.

9. The apparatus of claim 2, wherein:
- said stanchions are adapted to support said apparatus on a floor; and
- said spacing means is adjustable for selectively varying the distance between said stanchions.

10. The apparatus of claim 9, wherein said stabilizing means comprises:
- a pair of brackets secured to the opposed jambs of a doorway; and
- bracket engaging means mounted to said stanchions in registry with said brackets for releasably engaging said brackets.

11. The apparatus of claim 4, wherein said leg restraining means comprise a pair of rigid, elongated arms, each of said arms being attached at one of its ends to one of said stanchions and supporting said cross member at its other end.

12. The apparatus of claim 11 wherein said mounting means comprises a pair of sleeves fixed to the upper extremities of each of said stanchions and adapted to receive the ends of said arms.

13. The apparatus of claim 11, wherein said cross member is rigid.

14. The apparatus of claim 10, wherein said leg restraining means comprise a pair of rigid, elongated arms, each of said arms being attached to one of said stanchions and supporting said cross member at its other end.

15. The apparatus of claim 14, comprising attachment means for releasably attaching said arms to said stanchions alternatively in vertical alignment with, or perpendicular to said stanchions.

16. The apparatus of claim 14, wherein said cross member is rigid.

* * * * *